US011225266B2

(12) United States Patent
Domeyer et al.

(10) Patent No.: US 11,225,266 B2
(45) Date of Patent: Jan. 18, 2022

(54) SYSTEMS AND METHODS FOR IMPROVING VISUAL SCANNING BEHAVIOR ASSOCIATED WITH CONTROLLING A VEHICLE

(71) Applicant: Toyota Motor Engineering & Manufacturing North America, Inc., Plano, TX (US)

(72) Inventors: Joshua E. Domeyer, Madison, WI (US); John K. Lenneman, Okemos, MI (US); Benjamin P. Austin, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/545,068

(22) Filed: Aug. 20, 2019

(65) Prior Publication Data
US 2021/0053586 A1 Feb. 25, 2021

(51) Int. Cl.
*B60W 50/14* (2020.01)
*G06F 3/01* (2006.01)
*G05D 1/00* (2006.01)
*B60W 60/00* (2020.01)
*G06T 11/00* (2006.01)
(Continued)

(52) U.S. Cl.
CPC .............. *B60W 50/14* (2013.01); *B60K 35/00* (2013.01); *B60W 40/08* (2013.01); *B60W 60/00* (2020.02); *G05D 1/00* (2013.01); *G06F 3/013* (2013.01); *G06T 11/00* (2013.01); *B60K 2370/175* (2019.05); *B60K 2370/193* (2019.05); *B60K 2370/31* (2019.05); *B60K 2370/52* (2019.05);
(Continued)

(58) Field of Classification Search
CPC ....... G06F 3/013; B60W 50/14; B60W 60/00; G05D 1/00
See application file for complete search history.

(56) References Cited

U.S. PATENT DOCUMENTS 8,344,894 B2 1/2013 Szczerba et al.
9,403,436 B1 8/2016 Yamada
(Continued)

FOREIGN PATENT DOCUMENTS

WO 2019017216 A1 1/2019

OTHER PUBLICATIONS

"Road vehicles—Measurement and analysis of driver visual behaviour with respect to transport information and control systems," ISO/CD 15007:2018(E), Jun. 19, 2018 (65 pages).
(Continued)

*Primary Examiner* — Matthew Salvucci
(74) *Attorney, Agent, or Firm* — Christopher G. Darrow; Darrow Mustafa PC

(57) ABSTRACT

System, methods, and other embodiments described herein relate to improving visual scanning behavior of an operator in a vehicle with a vehicle display. In one embodiment, a method includes, in response to detecting a transition to a manual mode of operating the vehicle, identifying, using at least one sensor of the vehicle, objects in a present operating environment around the vehicle according to a visual profile of the operator. The method also includes controlling the vehicle display to selectively render one or more graphic elements according to at least a gaze score.

33 Claims, 6 Drawing Sheets

(51) Int. Cl.
*B60W 40/08* (2012.01)
*B60K 35/00* (2006.01)

(52) U.S. Cl.
CPC ... *B60W 2050/146* (2013.01); *B60W 2540/00* (2013.01)

(56) References Cited

U.S. PATENT DOCUMENTS

| | | | |
|---|---|---|---|
| 9,684,306 B2 | 6/2017 | Sprigg | |
| 10,235,122 B1 * | 3/2019 | Goel | G06K 9/00597 |
| 2017/0282717 A1 * | 10/2017 | Jang | B60K 37/06 |
| 2017/0364070 A1 | 12/2017 | Oba | |
| 2019/0129416 A1 * | 5/2019 | Upmanue | B60W 40/08 |

OTHER PUBLICATIONS

SAE On-Road Automated Vehicle Standards Committee, "Surface Vehicle Recommended Practice—(R) Taxomony and Definitions for Terms Related to Driving Automation Systems for On-Road Motor Vehicles", SAE International J3016 Jun. 2018, Revised Jun. 2018 (35 pages).

Price, M. et al., "Effect of Automation Instructions and Vehicle Control Algorithms on Eye Behavior in Highly Automated Vehicles," International Journal of Automotive Engineering, vol. 10, No. 1 (2019) pp. 73-79.

\* cited by examiner

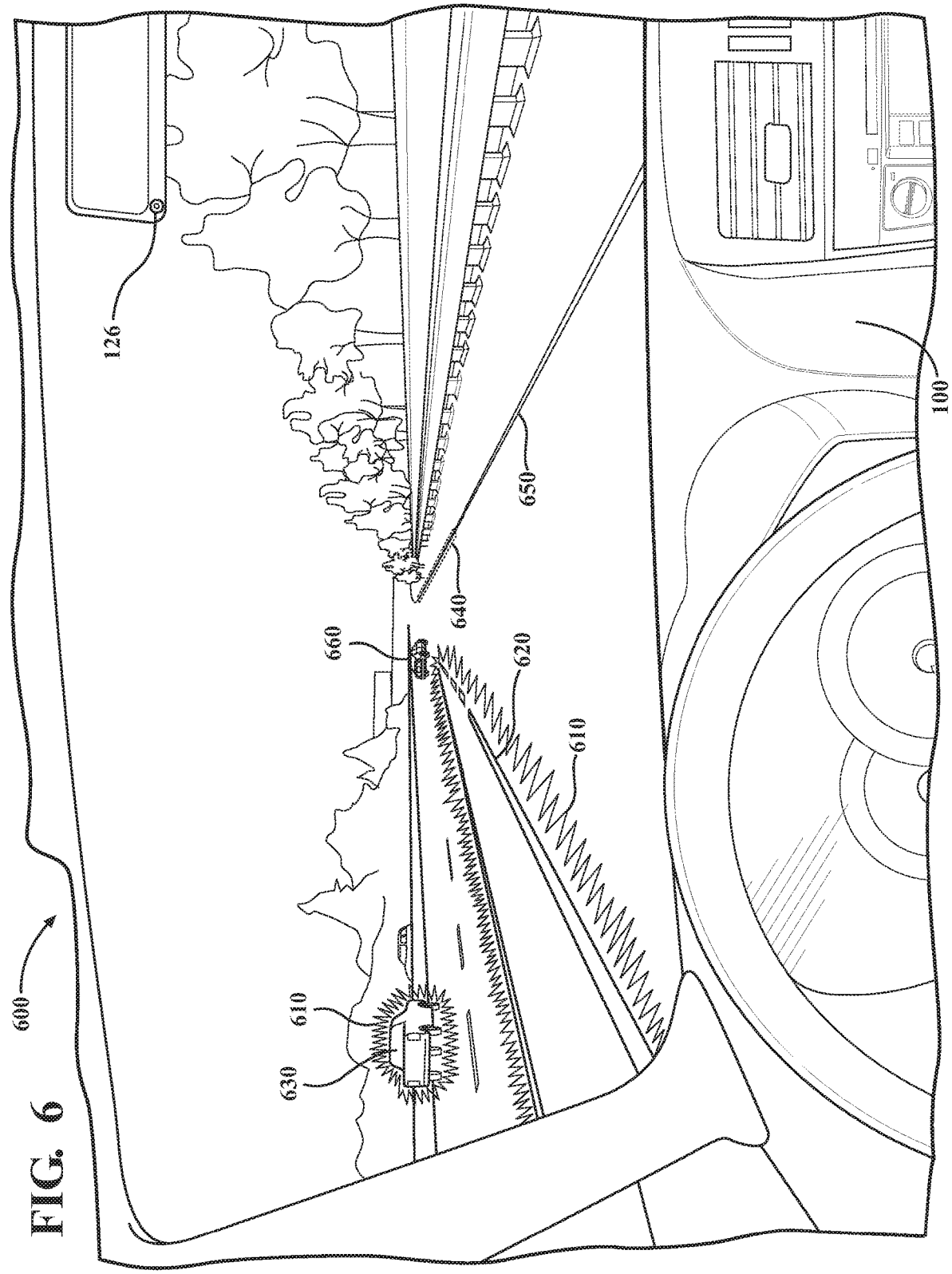

SYSTEMS AND METHODS FOR IMPROVING VISUAL SCANNING BEHAVIOR ASSOCIATED WITH CONTROLLING A VEHICLE

TECHNICAL FIELD

The subject matter described herein relates in general to systems and methods for improving an operator's visual attention when operating a vehicle having some form of driving automation system, and, more particularly, to using a vehicle display to render graphic elements until the visual scanning behavior of an operator satisfies a threshold.

BACKGROUND

Advanced driver-assistance systems (ADAS) are systems developed to help an operator perform the driving task while promoting a safer and more enjoyable driving experience. Along the driving automation continuum to full automation (e.g., Society of Automotive Engineers (SAE) Level 5), the operator can delegate more of the driving task to the driving automation and allow it to control a vehicle. With increasing automation, other tasks, such as texting, watching videos, sleeping, etc. often redirect the visual attention of the operator from visual information that is useful for driving the vehicle. In other words, operating in an automation mode acclimatizes operators to not look at the external environment.

When the vehicle is operating under some level of automation, whether the operator should be ready to take control or the operator optionally takes control of the vehicle, at some point, the vehicle transitions from automated steering to manual control by the operator. Moreover, a phenomenon associated with driving automation systems exists where the operator's ability to visually scan the driving environment, after the transition to manual control, has been diminished. For example, the operator's visual attention to the roadway may lessen as a result of habituating to visual scanning behaviors used while the vehicle was in an automated mode. Thus, there is a need to provide a safety mechanism to counter potential negative effects of transitioning from automated steering control to manual steering control.

SUMMARY

Example systems and methods are disclosed herein that relate to a manner of improving a visual scanning behavior of an operator in a vehicle. Visual scanning behavior, in the context of operating a vehicle, generally refers to a tendency of a vehicle operator to visually sample an exterior environment surrounding the vehicle. As previously noted, the operator's visual scanning behavior, upon entering the manual mode of operation after spending an appreciable amount of time in an automated mode, e.g., one minute, ten minutes, one hour, etc., may have been diminished Accordingly, in one or more embodiments, a vehicle display (e.g., a heads-up display (HUD)) is used in a manner as disclosed herein to improve the visual scanning behavior by directing the visual attention of the operator to the roadway. For example, in one aspect, the noted systems and methods identify objects in an operating environment around the vehicle. Furthermore, the disclosed system and methods control the vehicle display to place graphic elements in the vehicle display at locations that correspond to the locations of the objects. The graphic elements, for example, can be selectively flashed to increase the visual attention of the operator.

Moreover, the disclosed systems and methods can use a more active approach to decrease the time to reach a threshold of visual scanning behavior. Accordingly, in one embodiment, objects the operator was viewing while driving at a defined performance level, e.g., a peak performance level, are monitored and compared to a present scanning behavior. The objects can be items typically found on and around a roadway while driving such as, for example, road signs, vehicles, lane markers, pedestrians, etc. The noted systems and methods can identify previously viewed objects in the present operating environment, including particular types/classes of objects. In one embodiment, the disclosed systems and methods can control the vehicle display to place the graphic elements at locations that correspond to objects in the present operating environment, which match the previously viewed objects. The noted systems and methods can then, for example, maintain the display of the graphic elements until the visual attention of the operator improves as the systems indicate via detecting a threshold driving performance. Therefore, in one or more arrangements, the noted systems and methods improve recovery times associated with temporary degradations in visual scanning behavior that can result from using vehicle systems that provide automated steering.

In one embodiment, a visual attention system for improving a visual scanning behavior of an operator in a vehicle with a vehicle display is disclosed. The visual attention system includes one or more processors and a memory that is communicably coupled to the one or more processors. The memory stores a monitoring module including instructions that when executed by the one or more processors cause the one or more processors to identify, in response to detecting a transition to a manual mode of operating the vehicle using at least one sensor of the vehicle, objects in a present operating environment around the vehicle according to a visual profile of the operator. The memory stores a rendering module including instructions that when executed by the one or more processors cause the one or more processors to control the vehicle display to selectively render one or more graphic elements according to at least a gaze score.

In one embodiment, a non-transitory computer-readable medium for improving a visual scanning behavior of an operator in a vehicle with a vehicle display is disclosed. The non-transitory computer-readable medium stores instructions that when executed by one or more processors cause the one or more processors to perform the disclosed functions. The instructions include instructions to identify, in response to detecting a transition to a manual mode of operating vehicle using at least one sensor of the vehicle, objects in a present operating environment around the vehicle according to a visual profile of the operator. The instructions include instructions to control the vehicle display to selectively render one or more graphic elements according to at least a gaze score.

In one embodiment, a method for improving a visual scanning behavior of an operator in a vehicle with a vehicle display is disclosed. The method includes, in response to detecting a transition to a manual mode of operating the vehicle, identifying, using at least one sensor of the vehicle, objects in a present operating environment around the vehicle according to a visual profile of the operator. The method includes controlling the vehicle display to selectively render one or more graphic elements according to at least a gaze score.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6 illustrates an interior view of a vehicle and elements displayed within a vehicle display system.

DETAILED DESCRIPTION

Systems, methods, and other embodiments associated with improving a visual scanning behavior of an operator are disclosed. As mentioned earlier, a phenomenon of decreased visual attention in the form of a diminished visual scanning ability can occur after transitioning from an automated mode to a manual mode of operation. This disclosure presents systems and methods that improve the visual scanning behavior of the operator thereby mitigating decreased visual attention during handover.

Accordingly, in one embodiment, a visual attention system identifies objects in a present operating environment around the vehicle according to a visual profile of the operator. For example, in one embodiment, the visual attention system identifies objects by analyzing dynamic vehicle data to determine objects in the present operating environment having classifications that are similar to the vehicle profile. In one arrangement, the visual profile includes a gaze behavior of the operator when the operator was previously driving at a defined performance level. For example, the gaze behavior indicates a focus of eyes of the operator on a particular set of target objects, such as road signs, vehicles, lane markers, pedestrians, etc. Further, the gaze behavior can also indicate how long the eyes are trained on the road as opposed to an interior of the vehicle. In one or more arrangements, the visual attention system generates a gaze score that characterizes deviations of a present gaze behavior from the gaze behavior of the visual profile.

Therefore, in efforts to bring the visual scanning behavior of the operator back to a threshold level, the visual attention system, in one embodiment, controls a vehicle display to selectively render one or more graphic elements according to at least the gaze score. For example, the visual attention system renders the one or more graphic elements in the vehicle display (e.g., in an augmented reality manner via a HUD) in response to a transition to the manual mode until the gaze score satisfies a stability threshold. In one arrangement, the visual attention system can, for example, overlay graphics in the vehicle display at locations coinciding with perimeters of the objects, and selectively flash the graphics. Therefore, in one embodiment, the visual attention system provides visual stimulus to encourage the operator to visually scan in a manner similar to when the operator was manually driving at the defined performance level. In this way, the visual attention system can facilitate ramping the visual scanning behavior of the operator in an accelerated timeframe, thus enhancing safety.

Figure 1:
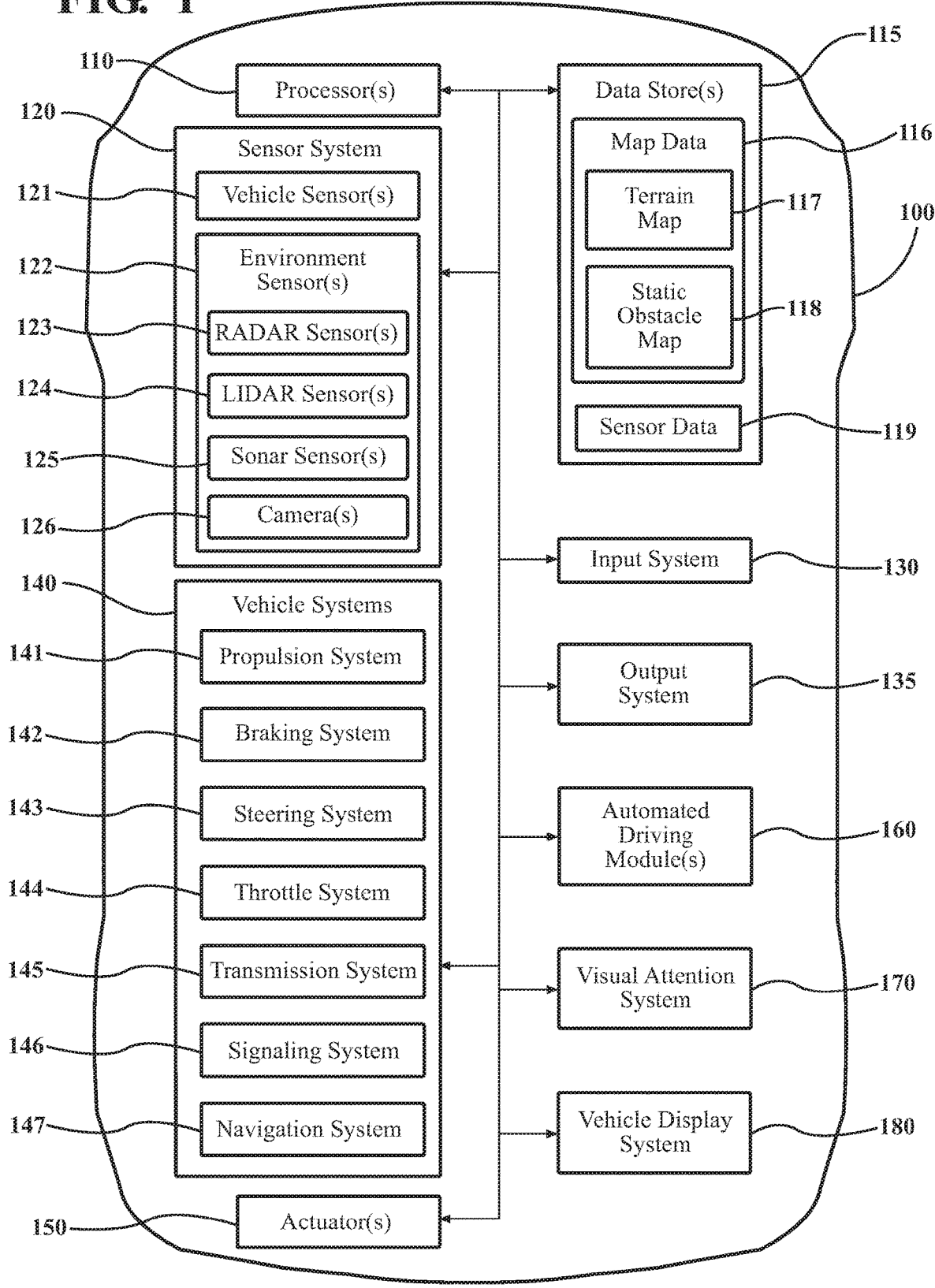
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any other form of powered transport that, for example, can operate at least in a semi-automated mode, includes a vehicle display system or capabilities to support a vehicle display system, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

According to arrangements herein, the vehicle 100 can be an automated vehicle. As used herein, "automated vehicle" means a vehicle that is configured to operate in an automated mode. "Automated mode" means that one or more computing systems are used to navigate and/or maneuver the vehicle 100 along a travel route with minimal or no input from a human operator. Furthermore, the automated mode may include automated steering. As used herein, "automated steering" means that one or more computing systems are used to steer the vehicle 100 along a travel route with no input from a human operator.

The vehicle 100 can have a plurality of operational modes. For instance, the vehicle 100 can have an unmonitored automated mode. "Unmonitored automated mode" means that one or more computing systems navigate and/or maneuver the vehicle 100 along a travel route with no input or supervision required from a human operator. As an example, the unmonitored automated mode can include Level 4 (L4), as defined by the SAE International's J3016 Standard: Taxonomy and Definitions for Terms Related to Driving Automation Systems for On-Road Motor Vehicles (June 2018) ("SAE J3016 Standard"), which is incorporated herein by reference. The vehicle 100 can have a receptive automated mode. "Receptive automated mode" means that one or more computing systems navigate and/or maneuver the vehicle 100 with at least some human operator receptiveness to alerts by the computing systems. As an example, the receptive automated mode can include Level 3 or L3, as defined by the SAE J3016 Standard. In some instances, when the vehicle 100 is in the receptive automated mode, a signal (e.g., an audial signal, a visual signal, a haptic signal, etc.) can be presented to a human operator requesting the operator to intervene and take an action within a predetermined amount of time. If such action is not taken within the predetermined amount of time, one or more safety maneuvers can be implemented.

The vehicle 100 can have one or more semi-automated modes. "Semi-automated mode" means that a portion of the navigation and/or maneuvering of the vehicle 100 along a travel route is performed by one or more computing systems, and a portion of the navigation and/or maneuvering of the vehicle 100 along a travel route is performed by a human operator. As an example, the semi-automated mode can include Level 2 (L2—both steering and acceleration/deceleration control by a driver assistance system) and/or Level 1 (L1—either steering or acceleration/deceleration control by a driver assistance system), as defined by the SAE J3016 Standard. One example of the semi-automated mode is when a lane centering system is activated. In such a case, the lane centering system automatically maintains the position of the vehicle 100 along the centerline of a travel lane, but contact between hand and wheel may be used to confirm that a human operator is ready to intervene. Upon receiving a driver input to alter the travel lane (e.g., by signaling and merging onto an exit ramp from the highway), the lane centering system deactivates. The semi-automated mode may not include automated steering, for example, adaptive cruise control, where the human operator controls steering and the automated system controls speed.

The vehicle 100 can have a manual mode. "Manual mode" means that a human operator performs all the navigation and/or maneuvering of the vehicle 100 along a travel route with minimal or no input from a computing system. As an example, the manual mode can include Level 0 (L0), as defined by the SAE J3016 Standard. One example of a system that operates in the manual mode is a lane departure warning system. In this case, the vehicle 100 does not respond to external events, such as other vehicles, lane markings, traffic signs, etc., but may issue a passive warning to a human operator when the vehicle 100 deviates from the centerline of the lane by a predetermined value. The lane departure warning system is therefore not classifiable (other than at Level 0) under the SAE J3016 Standard.

In either case, the vehicle 100 includes a visual attention system 170 that is implemented to perform methods and other functions as disclosed herein relating to improving a visual scanning behavior of an operator after a transition to the manual mode, as shown in FIG. 1. Specifically, after the transition from the automated mode (e.g., unmonitored automated mode, receptive automated mode, or semi-automated mode that includes automated steering) to the manual mode. Furthermore, a vehicle display system 180 is illustrated as an additional aspect of the vehicle 100. However, it should be noted that while the vehicle display system 180 is illustrated as a sub-component of the vehicle 100, in various embodiments, the vehicle display system 180 can be partially integrated with the vehicle 100 or separate from the vehicle 100. Thus, in one or more embodiments, the vehicle display system 180 can communicate via a wired or wireless connection with the vehicle 100 to correlate functionality as discussed herein. Moreover, the vehicle display system 180 can include one or more displays (e.g., integrated or mobile) within which to display graphic elements to the operator.

It should be appreciated that the vehicle display system 180 can take many different forms but in general functions to augment or otherwise supplement viewing of objects within a real-world environment surrounding the vehicle 100. That is, for example, the vehicle display system 180 can overlay graphics using one or more vehicle displays in order to provide for an appearance that the graphics are integrated with the real-world through, for example, the windshield of the vehicle 100. Thus, the vehicle display system 180 can include vehicle displays integrated with the windshield, side windows, rear windows, mirrors, and other aspects of the vehicle 100. In one aspect, the vehicle display system 180 can include heads-up displays (HUDs). In further aspects, the vehicle display system 180 can include head-mounted displays such as goggles or glasses. In any case, the vehicle display system 180 functions to render graphical elements that are in addition to objects in the real-world. As one example, a monitor (e.g., HUD) is integrated within or just above a dashboard of the vehicle 100 and is controlled to display graphical elements rendered by the vehicle display system 180 with the real-world environment surrounding the vehicle 100. In this way, the vehicle display system 180 can augment a view of the operator in order to improve the visual scanning behavior of the operator. The noted functions and methods will become more apparent with a further discussion of the figures.

Figure 2:
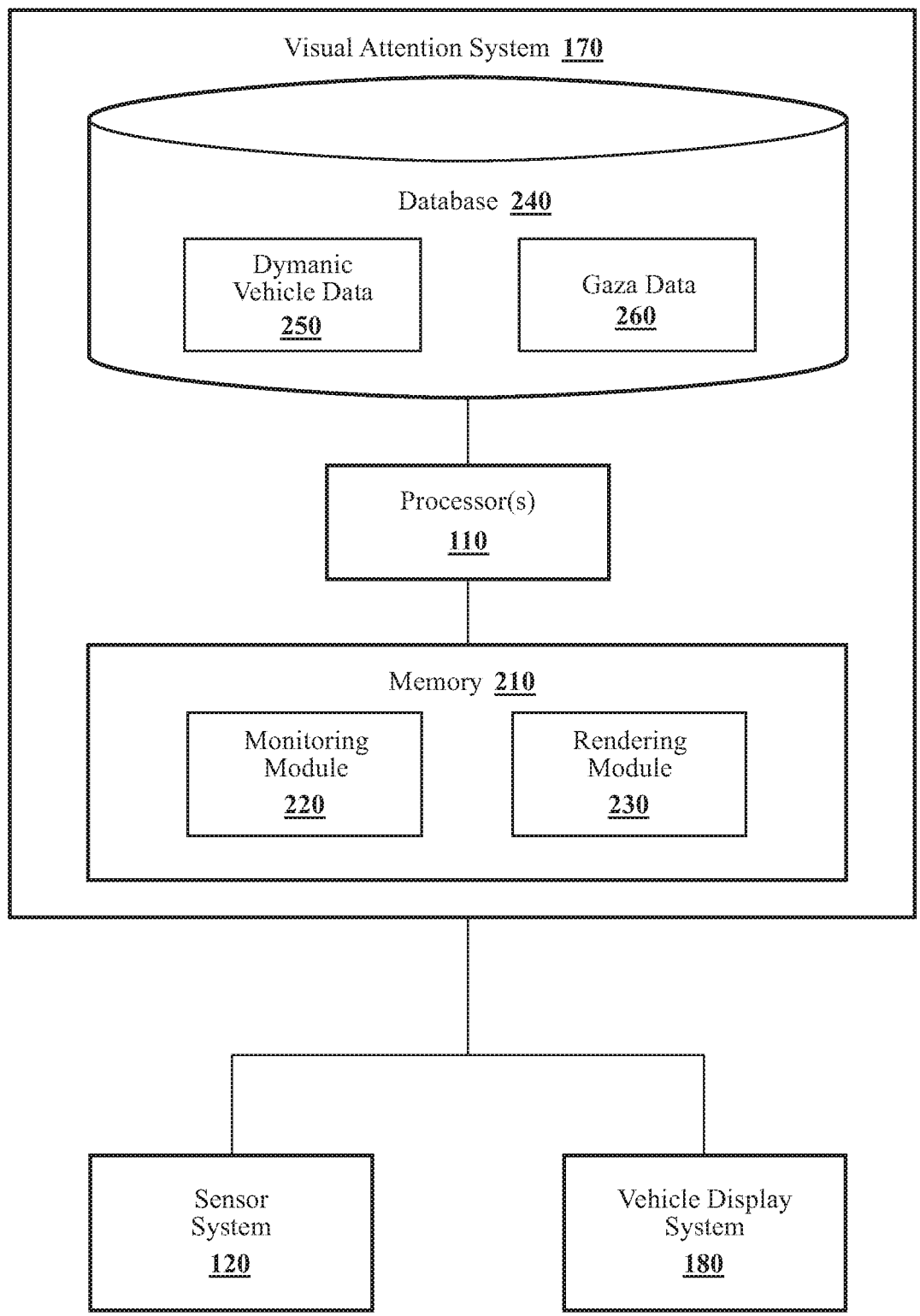
FIG. 2 illustrates one embodiment of a visual attention system that is associated with improving the visual scanning behavior of an operator in the vehicle.

With reference to FIG. 2, one embodiment of the visual attention system 170 of FIG. 1 is further illustrated. The visual attention system 170 is shown as including a processor 110 from the vehicle 100 of FIG. 1. Accordingly, the processor 110 may be a part of the visual attention system 170, the visual attention system 170 may include a separate processor from the processor 110 of the vehicle 100 or the visual attention system 170 may access the processor 110 through a data bus or another communication path. In one embodiment, the visual attention system 170 includes a memory 210 that stores a monitoring module 220 and a rendering module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110, cause the processor 110 to perform the various functions disclosed herein.

With continued reference to FIG. 2, in one embodiment, the visual attention system 170 includes a data store 240. The data store 240 is, in one embodiment, an electronic data structure (e.g., a database) for storing information. For example, in one approach, the data store 240 is a database that is stored in the memory 210 or another suitable medium, and that is configured with routines that can be executed by the processor 110 for analyzing stored data, providing stored data, organizing stored data, and so on. In either case, in one embodiment, the data store 240 stores data used by the modules 220 and 230 in executing various functions. In one embodiment, the data store 240 includes dynamic vehicle data 250 and gaze data 260 along with, for example, other information that is used by the modules 220 and 230.

Accordingly, the monitoring module 220 generally includes instructions that function to control the processor 110 to retrieve data from sensors of a sensor system 120 of the vehicle 100. In one example, the monitoring module 220 uses at least one sensor to identify objects in a present operating environment around the vehicle 100. Furthermore, in one embodiment, the monitoring module 220 identifies the objects according to a visual profile of the operator in response to detecting a transition to the manual mode. As will be developed further below, the visual attention system 170 strategically provides augmented stimulus via the vehicle display that encourages the operator to visually scan in a manner known to produce acceptable driving results, i.e., according to the visual profile.

Thus, by way of a brief example, the monitoring module 220 can identify the objects by analyzing image data collected from one or more cameras 126 of the sensor system 120 using image recognition. As such, the monitoring module 220 can execute one or more image recognition techniques (e.g., a machine learning algorithm performing image classification) to identify the objects in the present operating environment. In particular, the machine learning algorithm learns via a training process to automatically detect and classify the objects as embodied in the image data. Moreover, once detected and classified, the monitoring module 220, in one embodiment, can store a classification of the object and an associated location of the object relative to the vehicle 100 as dynamic vehicle data 250 for subsequent use by the monitoring module 220. Alternatively, the monitoring module 220 can, for example, retrieve internal state information from one or more automated driving modules 160 of the vehicle 100 that includes classifications of the objects detected via one or more sensors (e.g., LIDAR sensors 124).

Additionally, the monitoring module 220, in one embodiment, monitors the operator to collect the gaze data 260 from an eye-tracking camera. For example, the monitoring module 220 controls one or more cameras (e.g., cameras 126) that are disposed within an interior passenger compartment of the vehicle 100 to track eye movements of the operator. The eye movements, otherwise referred to as eye tracks, of the operator are useful in determining whether the operator is gazing at objects in front of the vehicle 100, within the passenger compartment, and so on. Thus, the monitoring module 220, for example, identifies from the gaze data 260 a direction in which the operator is presently gazing and a path of where the operator has been gazing over a period of time. Moreover, the monitoring module 220 can use the cameras 126 to track the pupil dilation, rates of eye movements, and further information about the operator.

Furthermore, a gaze in a particular direction may include various metrics that establish whether the eyes have fixated and/or glanced at an area of interest for a meaningful period. In one approach, the system 170 may define the various metrics according to the International Organization for Standardization/Committee Draft (ISO/CD) 15007:2018 Road vehicles—Measurement and analysis of driver visual behavior with respect to transport information and control systems (ISO/CD 15007 Standard). In further embodiments, the system 170 separately defines the metrics according to a custom set of metrics and/or adaptations. As an example, to recognize a gaze direction in the context of this disclosure, the gaze may include a minimum glance duration, i.e., a minimum time from the moment at which the direction of gaze moves toward an area of interest to the moment it moves away from it, e.g., two seconds. As another example, the gaze direction may include a minimum scan duration, i.e., a minimum time interval consisting of two or more glances that are linked in a consecutive set of fixations to areas of interest in the visual scene, e.g., three seconds. The gaze can include other metrics (e.g., glance location probability, mean glance duration, number of glances, etc.), which the system 170 defines according to the ISO/CD 15007 Standard and/or as the system 170 may otherwise define independently.

In further embodiments, the monitoring module 220 identifies a gaze behavior from at least the gaze data 260. For example, the gaze behavior indicates a focus of eyes of the operator on a particular set of target objects. Accordingly, the particular set of target objects are objects typically found in an operating environment around the vehicle 100 that the operator considers when driving in the manual mode. The particular set of target objects can include the objects identified as having classifications indicating at least one of road signs, vehicles, lane markers, roadways, and pedestrians. The monitoring module 220 can store/identify the particular set of target objects from the classifications in the dynamic vehicle data 250, hereinafter referred to as "present classifications." Further, the focus of eyes can also include the metrics, for example, durational (i.e., temporal type) metrics, as the system 170 defines according to the ISO/CD 15007 Standard and/or as the system 170 may otherwise define independently.

Additionally, for example, the gaze behavior indicates an eyes on road (EOR) time. In general, the EOR time is an amount of time the operator spends gazing at the roadway in front of and to sides of the vehicle 100 as opposed to gazing at the interior passenger compartment, e.g., mirrors, instrument panel, navigation display, etc. In one arrangement, a percentage is used to express the EOR time (e.g., (the amount of time spent gazing at the roadway divided by a time measurement period)*100%), where the time measurement period is, e.g., 10 seconds, 20 seconds, etc. The EOR time can include other suitable metrics, which the system 170 defines according to the International Organization for Standardization (ISO) ISO/CD 15007 Standard and/or as the system 170 may otherwise define independently. It should be appreciated that a gaze behavior having an EOR time of 100%, is not a necessary behavior. A lower EOR time is certainly acceptable (e.g., 95%, 90%, 85%, etc.) due to the operator checking the mirrors, gages, etc. However, an EOR time of, for example, 65%, 60%, etc., can indicate poor visual scanning behavior, i.e., texting, dozing off, etc.

Furthermore, the gaze behavior of the operator may include gaze patterns. For example, alternatively gazing between specific target objects at a specific frequency is considered a gaze pattern. As another example, incorporating a gaze at the rearview mirror while alternatively gazing between specific target objects is considered another gaze pattern. In other words, the gaze behavior can include, for example, any discernable gaze pattern that demonstrates more than one instance where the operator repeats a gaze direction.

In further aspects, the monitoring module 220 generates a gaze score of the operator that characterizes deviations of a present gaze behavior from the visual profile. The visual attention system 170 utilizes the gaze score to determine that the present gaze behavior exhibits satisfactory visual scanning behavior, as set forth below.

Accordingly, the visual profile, for example, indicates the gaze behavior of the operator when the operator was previously driving at a defined performance level. The monitoring module 220, in one embodiment, monitors at least one performance attribute and generates the defined performance level using a heuristic to process the at least one performance attribute. In other words, the monitoring module 220 executes the heuristic to generate the defined performance level (e.g., a peak driving performance level) from the at least one performance attribute.

Additionally, the performance attributes, in one arrangement, include one or more of a braking frequency, a steering wheel reversal rate, an accelerator depression frequency, and a frequency of deviations of the vehicle 100 from a centerline. The monitoring module 220, in one arrangement, analyzes or otherwise electronically mines information from vehicle systems 140 (FIG. 1) to determine the performance attributes, e.g., the sensor system 120, a braking system 142, a throttle system 144, a navigation system 147, a lane positioning system, etc.). For example, the monitoring module 220 defines the performance attributes over a defined time period (e.g., sixty seconds, five minutes, etc.) and/or a defined distance (e.g., one mile, two miles, etc.). The monitoring module 220 may use other suitable performance attributes as input into the heuristic.

In further aspects, the monitoring module 220 executes the heuristic to process at least one of the performance attributes to generate the defined performance level. By way of an example, the monitoring module 220 executes the heuristic to monitor the performance attributes over time to determine a running average and/or statistical measures (e.g., a population mean, standard deviation, etc.) of the performance attribute while in manual mode. Further, the monitoring module 220 implements the heuristic to generate the defined performance level when one or more of the performance attributes reaches or falls below the running average and/or the statistical measures. Alternatively, or in addition to, the performance attributes may be weighted, i.e., one or more performance attributes may be more important than others. In this case, the defined performance level can be a function of the weighted performance attributes. As yet another example, the monitoring module 220 implements the heuristic to monitor the performance attributes from a training session where the operator drives the vehicle 100 at a performance level that the system 170 considers optimal to generate the defined performance level.

Moreover, each operator of the vehicle 100 may have one or more uniquely defined performance levels. The monitoring module 220, in one arrangement, executes the heuristic to update the defined performance level over time. An input system 130 (FIG. 1) of the vehicle 100 may identify the operator using, for example, biometric devices such as a fingerprint receiver, a retinal scan device, face recognition camera, pattern inputs, etc. Each operator can have one or more defined performance levels. For example, defined performance levels can be associated with a time of day, driving in traffic, during specific events (e.g., daily commute), driving in rural environments, etc. The monitoring module 220 can determine (e.g., driving conditions, driving environments, etc.) from the one or more automated driving modules 160.

Furthermore, the monitoring module 220, in one arrangement, correlates the gaze behavior of the operator to the particular set of target objects identified while driving at the defined performance level using the associated gaze data 260. That is, the monitoring module 220 identifies the particular set of target objects the operator was focusing on, as well as the associated EOR time, while driving at the defined performance level. The monitoring module 220 may store this gaze behavior, hereinafter referred to as "past gaze behavior," in the data store 240. In one arrangement, the gaze behavior, for example, the past gaze behavior, is defined over at least a period of time and a distance. The monitoring module 220, in one arrangement, stores past classifications associated with the particular set of target objects the operator was focusing on while driving at the defined performance level and the relative locations of the particular set of target objects as dynamic vehicle data 250. Further, the monitoring module 220 can continually collect the gaze data 260 and correlate the gaze behavior to the particular set of target objects while driving at defined performance levels. It should be appreciated that the past gaze behavior may include objects focused upon by the operator that are behind the vehicle 100, e.g., as viewed through the rearview mirror.

Continuing with the discussion of the visual attention system 170 of FIG. 2, the rendering module 230, in one embodiment, generally includes instructions that function to control the processor 110 to control the vehicle display system 180 to selectively render one or more graphic elements according to at least the gaze score. That is, the rendering module 230 reacts to how the present gaze behavior of the operator is aligning with the visual profile, i.e., the past gaze behavior. Accordingly, the rendering module 230, for example, renders graphical elements within the vehicle display system 180 of the present operating environment to improve the visual attention and thus the visual scanning behavior of the operator. The rendering module 230 can intensify/escalate how the graphical elements within the vehicle display are presented according to the gaze score. In one embodiment, the rendering module 230 renders the graphical elements by selectively flashing the graphics, varying the colors, rendering additional graphics, adjusting an opacity of the graphics, applying the graphics to two or more objects in an alternative fashion, and so on.

It should be appreciated that the rendering module 230 can produce many different graphical elements within one or more displays (e.g., front, side, rear, head-mounted) of the vehicle display system 180. However, regardless of the particular graphical elements, the rendering module 230 renders the graphics as a function of the gaze score. Thus, the rendering module 230 functions to dynamically generate content with the vehicle display system 180 according to the gaze score in efforts to increase the visual attention of the operator. Therefore, the rendering module 230 dynamically adjusts which graphical elements are rendered, how the graphical elements are rendered, where the graphical elements are rendered, and so on in a manner that can improve the visual scanning behavior of the operator.

Figure 3:
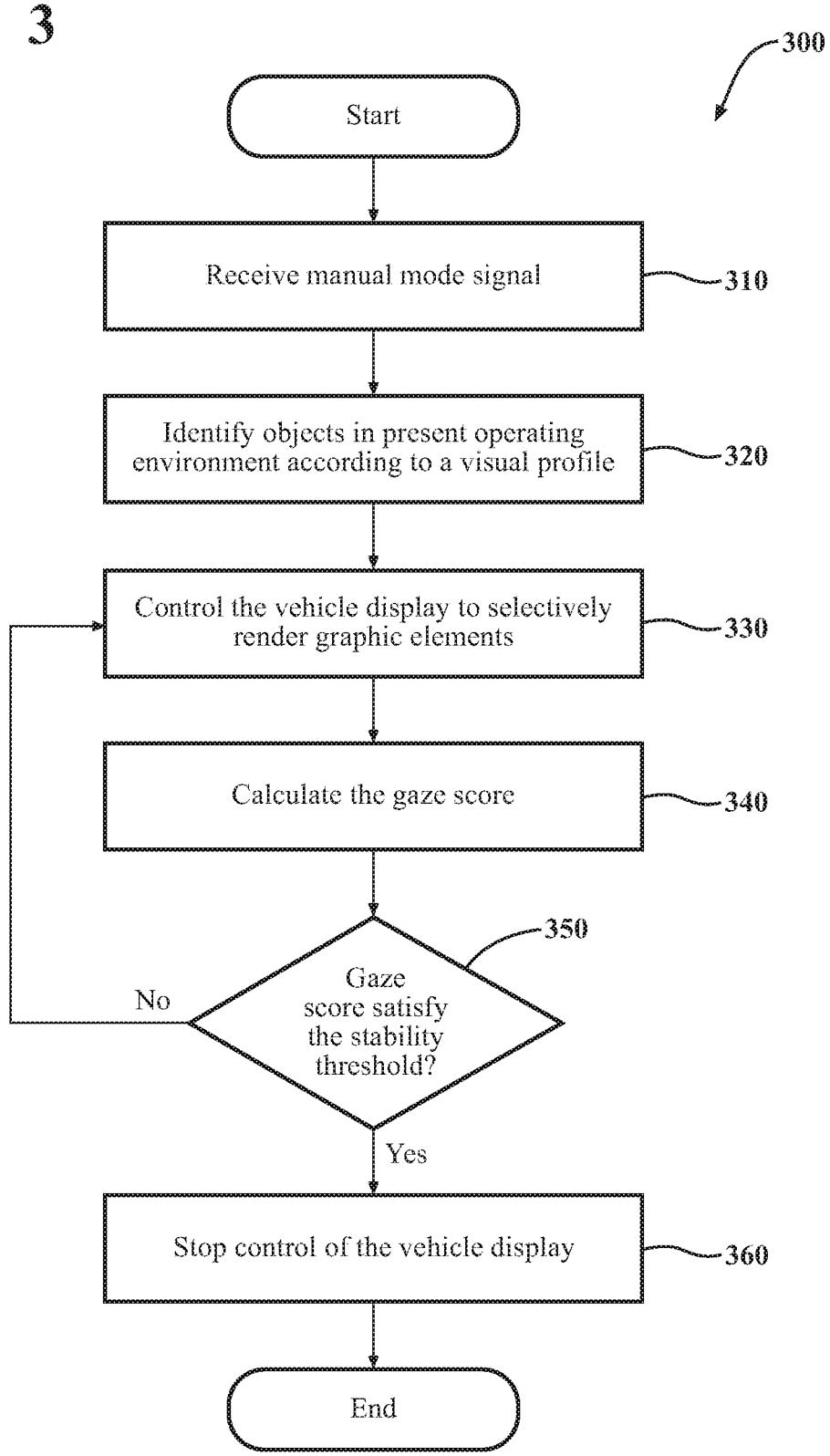
FIG. 3 is one example of a method that is associated with inducing visual attention to a roadway for improving the visual scanning behavior of the operator.

Additional aspects of improving the visual scanning behavior of the operator using augmented reality to display dynamic graphical elements according to a gaze score will be discussed in relation to FIG. 3. FIG. 3 illustrates a flowchart of a method 300 that is associated with improving the visual scanning behavior of the operator in the vehicle 100. Method 300 will be discussed from the perspective of the visual attention system 170 of FIGS. 1 and 2. While method 300 is discussed in combination with the visual attention system 170, it should be appreciated that the method 300 is not limited to being implemented within the visual attention system 170, but is instead one example of a system that may implement the method 300.

At 310, the monitoring module 220, in one or more arrangements, receives a manual mode signal representing that automated steering is deactivated. For example, the one or more vehicle systems 140 and/or the one or more automated driving modules 160 may output the manual mode signal in a wired or wireless fashion such that it is available to the monitoring module 220.

The transition from the automated mode (e.g., unmonitored automated mode, receptive automated mode or semi-automated mode including automated steering) to manual mode may occur as a result of various operations performed by the operator and/or the vehicle 100. For example, the transition from the automated mode to the manual mode may be due to the operator disengaging an automated control switch, the operator depressing the brake pedal, or the operator taking control of the steering wheel to drive the vehicle 100. The transition to manual mode may occur as a result of the automated driving module(s) 160 determining that the conditions for automated mode are no longer being met and automatically changing the operating mode from the automated mode to the manual mode, etc. The above list is not exhaustive, and there may be other conditions that would cause the transition.

At 320, the monitoring module 220 identifies objects in the present operating environment according to the visual profile. For example, in one embodiment, the monitoring module 220 analyzes the dynamic vehicle data 250 to determine the objects in the present operating environment having the classifications that are similar to the visual profile. That is, the monitoring module 220 analyzes the present classifications, i.e., the classifications associated with the particular set of target objects in the present operating environment, and the past gaze behavior, i.e., what particular set of target objects the operator was focused upon while driving at the defined performance level, to determine similarities. The past gaze behavior may be dependent upon the chosen defined performance level. For example, the monitoring module 220 may determine that the current driving conditions dictate using a defined performance level of the operator associated with the current driving conditions.

By way of an example, the monitoring module 220 analyzes the past gaze behavior, which reveals that the operator was focused on a vehicle, for example, within ten meters from the vehicle 100. Further analysis reveals that the vehicle was located in front of the vehicle 100 and to the left side of a longitudinal axis of the vehicle 100. Accordingly, the monitoring module 220 analyzes the present classifications from the dynamic vehicle data 250, which reveal a vehicle within eight meters from the vehicle 100 on the left side. Therefore, this vehicle may be considered similar. Moreover, a vehicle revealed from the present classifications may be considered similar by being within ten meters of the vehicle 100, regardless of whether it is on the right side or left side of the vehicle 100. Various methods may be used by the monitoring module 220 to determine the similarities, for example, vehicles, pedestrians, lane markers, and road signs within the same distance and/or relative location corresponding to the past gaze behavior, groupings of vehicles corresponding to the past gaze behavior, etc.

At 330, the rendering module 230 controls the vehicle display system 180 to render graphic elements selectively. In general, the rendering module 230 renders graphic elements until the operator has improved their visual scanning behavior according to a condition, as set forth below. Until that condition occurs the rendering module 230 controls the vehicle display system 180 to render graphics in a manner promoting improved visual scanning behavior. For example, the rendering module 230 can modulate the graphic elements according to a number of objects that are similar between the past classifications and the present classifications, a distance an object in the present classification is from the vehicle 100, the gaze score, etc.

Accordingly, for example, the rendering module 230 can add, in one or more vehicle displays, graphic elements (e.g., graphic overlays) to locations coinciding to perimeters of the objects and flash the graphic overlays at a given frequency. The rendering module 230, in one arrangement, selectively flashes the graphic overlay at different frequencies according to at least one of an object classification type and a relative distance the object is from the vehicle 100 in the present operating environment. The rendering module 230 may vary a number of graphic elements displayed within the vehicle display and the opacity and/or the color of the graphic overlay. Furthermore, the rendering module 230 may flash the graphic overlay between two or more objects (e.g., at locations coinciding to the perimeters of the objects) in an alternating fashion.

As an additional note, the rendering module 230 may receive the graphic elements from a remote server. For example, map data 116 and/or sensor data 119 (FIG. 1) located remotely from the vehicle 100, as set forth below, may include graphic elements of objects (e.g., graphic overlays and their location coordinates) that are stationary or change infrequently, such as road signs, lane markers, etc.

Additionally, the rendering module 230 may store rendering sequences and track those rendering sequences that produced improved visual scanning behaviors. For example, the rendering module 230 can analyze a trend in the rendering sequences over a plurality of assessments at 350. As such, depending on the trend (e.g., a trend producing a favorable gaze score), the rendering module 230, for example, stores the rendering sequence for future use, adjusts the rendering to promote favorable gaze scores, etc. Further examples and aspects of the content rendered in the vehicle display system 180 will be discussed in relation to FIGS. 4-6 subsequently.

As an additional matter, while the rendering module 230 is discussed as performing the functionality of rendering various graphics on displays of the vehicle display system 180, in various embodiments, the rendering module 230 can control the vehicle display system 180 to render the graphics according to various electronic instructions communicated to the vehicle display system 180 by the rendering module 230.

At 340, the monitoring module 220, in one arrangement, calculates the gaze score. Specifically, the monitoring module 220 characterizes deviations of the present gaze behavior from the past gaze behavior. For example, the monitoring module 220 tracks how the operator is responding to the graphic elements rendered by the rendering module 230. In this case, the rendering module 230 may begin to add graphic elements in the visual display consistent with the past gaze behavior, and as a result, the monitoring module 220 tracks an amount of time the operator takes for the present gaze behavior to focus on a target object. As the amount of time decreases, the deviation decreases, and thus, the gaze score improves. As another example, the rendering module 230 may alternate flashing of the graphic overlays between two or more target objects. In this case, the monitoring module 220 tracks the time the gaze behavior takes to move between the target objects. Again, a decrease in the amount of time to gaze between the objects corresponds to an improved gaze score. The monitoring module 220 may utilize any suitable method and metric to quantify the effects of the rendering module 230 on the current gaze behavior.

Additionally, in one or more arrangements, the EOR time is considered as a factor in determining the gaze score. In further aspects, the monitoring module 220 may determine, from past gaze behaviors when driving at various defined performance levels, a consistent EOR time, or a mean EOR time with a small standard deviation. In this case, the past gaze behavior used to determine the gaze score may incorporate the consistent EOR time instead of the EOR time determined during when the past gaze behavior was established.

At 350, the rendering module 230 determines whether the gaze score satisfies a stability threshold. In one embodiment, the rendering module 230 controls the vehicle display system 180 to selectively render by initially displaying the one or more graphic elements in response to the transition and until the occurrence of the gaze score satisfying the stability threshold. For example, the stability threshold may be satisfied when the gaze score attains a specific level of improvement as determined at 340.

Alternatively, or in addition to, in one arrangement, the rendering module 230 controls the vehicle display system 180 to selectively render by initially displaying the one or more graphic elements in response to the transition and until a defined time elapses. For example, the defined time may elapse before the gaze score needed to satisfy the stability threshold occurs. As another example, the rendering module 230 may add additional time for selective rendering even as the gaze score satisfies the stability threshold due to, e.g., changing driving conditions, etc.

As yet another alternative, in one arrangement, the rendering module 230 controls the vehicle display system 180 to selectively render by initially displaying the one or more graphic elements in response to the transition and until a defined time-out period elapses. Upon reaching the defined time-out period, the rendering module 230, in one arrangement, phases out the rendering, e.g., during a defined phase-out time (e.g., 10 seconds). In this case, phasing out the rendering can be utilized as a result of the gaze score not reaching the stability threshold. For example, phasing out the rendering may include decreasing a flashing frequency, using less opaque rendering, etc. Other circumstances may dictate phasing out the rendering. For example, the operator may become accustomed to the visual attention system 170 and phasing out the rendering may modify the current visual scanning behavior to improve the gaze score. In other cases, phasing out the rendering can add more time to induce visual attention to the roadway.

At 360, the rendering module 230 stops controlling the vehicle display system 180 to render graphic elements as a result of satisfying the stability threshold. Furthermore, the additional alternatives to satisfying the threshold mentioned above cause the rendering module 230 to stop controlling the vehicle display system 180.

In one aspect, the method 300 reinitiates when another transition to the manual mode of operation occurs. In other aspects, instead of receiving the transition to the manual mode, a variation of the method 300 occurs while the vehicle 100 is in the manual mode. For example, while the monitoring module 220 is collecting the gaze data 260, the monitoring module 220 may determine when, e.g., a low EOR time occurs (e.g., less than 30%), the operator is dozing off, the geographic location has not been traversed in the past, etc., and activate an alarm signal. In this case, the method 300 can be initiated at 320 in response to activating the alarm signal instead of, at 310, receiving the manual mode signal.

In other aspects, the visual profile may not be available. For example, the operator uses glasses that does not allow for the eye-tracking camera to collect the gaze data 260. In this case, the monitoring module 220 analyzes the dynamic vehicle data 250 to determine the objects in the present operating environment having the classifications that are similar to a default set of classifications. The default set of classifications can include, for example, road signs, vehicles, lane markers, pedestrians, and roadways. As a result, the rendering module 230, in one embodiment, controls the vehicle display system 180 to selectively render the one or more graphic elements in response to the transition and until the defined time elapses. In other words, in this case, the rendering module 230 stops controlling the vehicle display system 180 after the defined time elapses.

Figure 4:
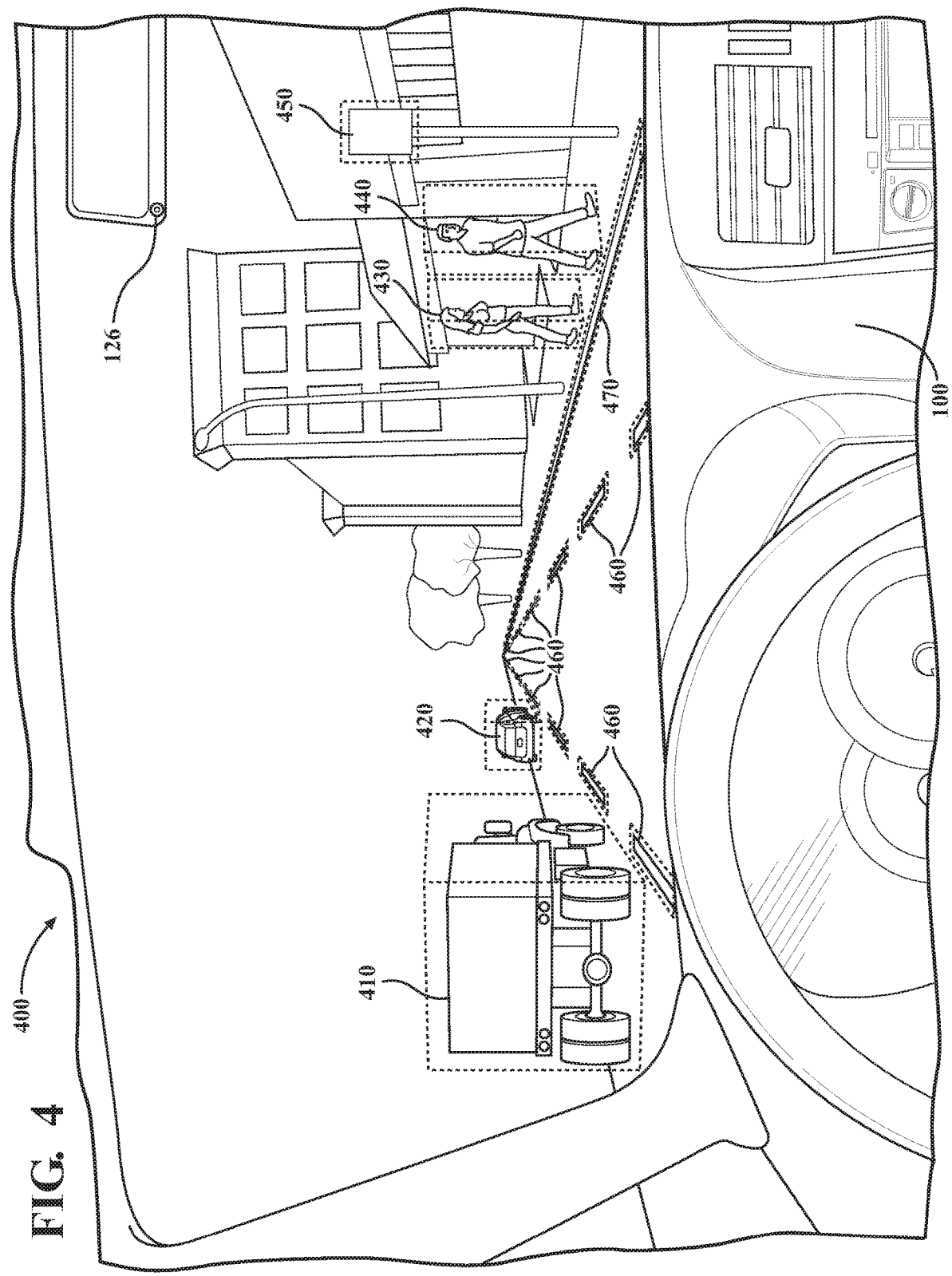
FIG. 4 illustrates an interior view of a vehicle and elements displayed within a vehicle display system.
Figure 5:
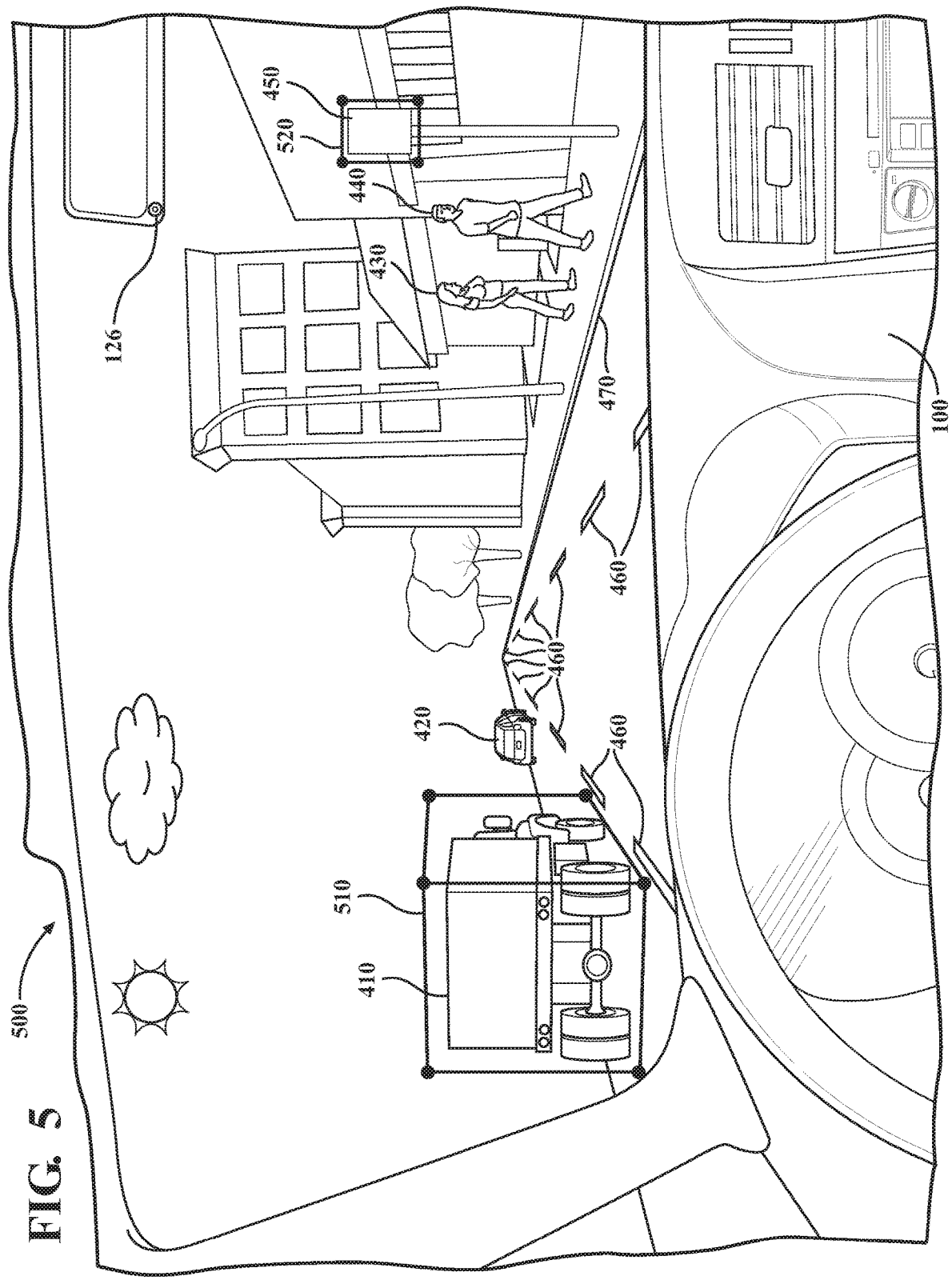
FIG. 5 illustrates an interior view of a vehicle that is similar to the view of FIG. 4 but is illustrated with further elements displayed within a vehicle display system.

As a further illustration of how the visual attention system 170 adapts the displays of the vehicle display system 180 to improve visual scanning behavior, consider FIGS. 4-6. FIG. 4 is a forward-facing view 400 from inside of the vehicle 100 looking through a windshield of the vehicle 100 and through a display of the vehicle display system 180, e.g., the HUD. FIG. 4 is a view that is not necessarily a view that would be presented to the operator of the vehicle 100. Instead, FIG. 4 is a view provided as a representative rendering of how the visual attention system 170 can control the vehicle display system 180 and how the present operating environment of the vehicle 100 can be rendered around the vehicle 100 depending on which direction the operator is presently gazing.

Thus, as shown in FIG. 4, the present operating environment is illustrated as being rendered with multiple graphical elements. Objects 410-470 have been classified and identified as a particular set of target objects by the vehicle 100. Additionally, the objects 410-470 are illustrated with graphic overlays, for example, dashed boxes, at locations coinciding to perimeters of the objects 410-470. For example, the visual attention system 170 may obtain the static graphic overlays for the objects 450, 460, and 470 from a remote server.

By contrast, FIG. 5 illustrates an alternative view 500 of the view 400 from FIG. 4. As shown in FIG. 5, the visual attention system 170 is rendering two graphics, including overlays within the view 500 through the vehicle display system 180 to improve the visual scanning behavior of the operator. Thus, the view 500 includes outline boxes 510 and 520 to highlight the vehicle 410 and the road sign 450, respectively, that are an embellished form of the dashed boxes of FIG. 4. By way of example, the visual attention system 170 determines from the past gaze behavior that the operator, while driving at the defined performance level in a city environment, alternates gazes between vehicles and road signs on a sidewalk. Accordingly, in the present operating environment, the visual attention system 170 controls the vehicle display system 180 to flash the outline boxes 510 and 520 in an alternate fashion at the same or similar frequency as found in the past gaze behavior. Furthermore, the target objects not within a defined distance of the vehicle 100 (e.g., the vehicle 420) do not have the graphic overlays. Additionally, the visual attention system 170 can, for example, vary the opacity and/or the color of the outline boxes 510 and 520 consistent with embodiments disclosed herein.

At a further example of different ways in which the visual attention system 170 can render graphical elements to induce visual attention of the operator to the roadway, consider FIG. 6. FIG. 6 illustrates a view 600 from within the vehicle 100 that is of a roadway merging situation in front of the vehicle 100 and various dynamic and static objects in the present operating environment. By way of example, the visual attention system 170 determines from a past gaze behavior of the roadway merging situation that the operator focuses on the lane markers and the vehicles adjacent to a merge lane with an EOR time of 95%. The present gaze behavior reveals the EOR time of the operator is 70% and that the associated gaze score is low. Accordingly, to increase the gaze score, the visual attention system 170 controls the vehicle display system 180 to flash a graphic overlay 610 of a lane marker 620 and a vehicle 630 adjacent to the merge lane. The view 600 includes a dashed box 640 at a location coincident with a portion of an opposite lane marker 650 consistent with the past gaze behavior. However, flashing of the dashed box 640 does not occur as it may be a distraction from directing attention, and thus the present gaze behavior, to the lane marker 620 and the vehicle 630 adjacent to the merge lane may increase the gaze score. As an additional note, a vehicle 660 is not rendered with any graphical element because the past gaze behavior did not focus on vehicles with that specific relative distance from the vehicle 100. However, for example, if the vehicle 660 slowed down such that the relative distance to the vehicle 630 and/or the vehicle 100 corresponds to the past gaze behavior, the visual attention system 170 may consider rendering the graphic overlay 610 at a location coincident with the location of the vehicle 660.

FIG. 1 will now be discussed in full detail as an example environment within which the system and methods disclosed herein may operate. In some instances, the vehicle 100 is configured to switch selectively between an automated mode (e.g., unmonitored automated mode or receptive automated mode), one or more semi-automated operational modes, and/or a manual mode. Such switching, i.e., handovers, to a manual mode can be implemented in a suitable manner, now known or later developed.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include the map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include the sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor(s) 110 to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition to, the sensor system 120 can include one or more environment sensors 122 configured to acquire, and/or sense driving environment data. "Driving environment data" includes any data or information about the external environment in which an automated vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include the one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the visual attention system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110 and/or the automated driving module(s) 160 may control some or all of these vehicle systems 140 and, thus, may be partially or fully automated.

The processor(s) 110 and/or the automated driving module(s) 160 may be operable to control the navigation and/or maneuvering of the vehicle 100 by controlling one or more of the vehicle systems 140 and/or components thereof. For instance, when operating in an automated mode, the processor(s) 110 and/or the automated driving module(s) 160 can control the direction and/or speed of the vehicle 100. The processor(s) 110 and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by the processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by the one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include the one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 can be configured to collect information about and/or determine travel path(s), current automated driving maneuvers for the vehicle 100, future automated driving maneuvers and/or modifications to current automated driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A visual attention system for improving a visual scanning behavior of an operator in a vehicle with a vehicle display, comprising:
    one or more processors; and
    a memory communicably coupled to the one or more processors and storing:
        a monitoring module including instructions that when executed by the one or more processors cause the one or more processors to:
            identify, in response to detecting a transition to a manual mode of operating the vehicle and using at least one sensor of the vehicle, objects in a present operating environment around the vehicle; and
            determine, based on information, contained in a visual profile of the operator, about a past gaze behavior of the operator in a similar operating environment, a particular gaze pattern with respect to specific objects of the objects; and
        a rendering module including instructions that when executed by the one or more processors cause the one or more processors to control the vehicle display to selectively render, according to at least a gaze score, one or more graphic elements in the vehicle display to augment or supplement a viewing of the specific objects in the present operating environment and for a specific duration of time, wherein the specific duration of time is less than a duration of time associated with a change in the gaze score, the duration of time being from a time of a commencement of the transition to a time at which the gaze score satisfies a stability threshold.

2. The visual attention system of claim 1, wherein the monitoring module further includes instructions to:
    monitor the operator including instructions to collect at least gaze data from an eye-tracking camera to identify a present gaze behavior, wherein the present gaze behavior indicates a focus of eyes of the operator on a particular set of target objects and an eyes on road (EOR) time, and
    generate, in response to the transition, the gaze score of the operator including instructions to characterize deviations of the present gaze behavior from the visual profile.

3. The visual attention system of claim 2, wherein the visual profile indicates the present gaze behavior of the operator when the operator was previously driving at a defined performance level, and
    wherein the monitoring module further includes instructions to determine the defined performance level including instructions to:
        monitor at least one performance attribute including one or more of a braking frequency, a steering wheel reversal rate, an accelerator depression frequency, or a frequency of deviations of the vehicle from a centerline, and
        generate the defined performance level using a heuristic to process the at least one performance attribute.

4. The visual attention system of claim 1, wherein the specific duration of time is based on at least one of: a duration of time for the gaze score to satisfy a stability threshold, a duration of time for a defined time to elapse, or a duration of time to phase out the rendering after a defined time-out period.

5. The visual attention system of claim 1, wherein the rendering module further includes instructions to control the vehicle display by one or more of:
    (i) adding elements to a perimeter of the objects as graphic overlays within the vehicle display and selectively flashing the graphic overlays at different frequencies according to at least one of a classification of an object or a relative distance that the object is from the vehicle,
    (ii) varying a number of the graphic elements displayed within the vehicle display,
    (iii) varying at least one of an opacity or a color of the graphic elements within the vehicle display; or
    (iv) alternatively flashing the graphic overlays between two or more of the objects within the vehicle display.

6. The visual attention system of claim 1, wherein the monitoring module further includes instructions to analyze dynamic vehicle data to determine the objects in the present operating environment having classifications that are similar to the visual profile, and
    wherein the classifications indicate at least one of road signs, vehicles, lane markers, roadways, or pedestrians.

7. A non-transitory computer-readable medium for improving a visual scanning behavior of an operator in a vehicle with a vehicle display and storing instructions that when executed by one or more processors cause the one or more processors to:
    identify, in response to detecting a transition to a manual mode of operating the vehicle and using at least one sensor of the vehicle, objects in a present operating environment around the vehicle;
    determine, based on information, contained in a visual profile of the operator, about a past gaze behavior of the operator in a similar operating environment, a particular gaze pattern with respect to specific objects of the objects; and control the vehicle display to selectively render, according to at least a gaze score, one or more graphic elements in the vehicle display to augment or supplement a viewing of the specific objects in the present operating environment and for a specific duration of time, wherein the specific duration of time is less than a duration of time associated with a change in the gaze score, the duration of time being from a time of a commencement of the transition to a time at which the gaze score satisfies a stability threshold.

8. The non-transitory computer-readable medium of claim 7, further comprising instructions to:
monitor the operator to collect at least gaze data from an eye-tracking camera to identify a present gaze behavior, wherein the present gaze behavior indicates a focus of eyes of the operator on a particular set of target objects and an eyes on road (EOR) time, and
generate, in response to the transition, the gaze score of the operator to characterize deviations of the present gaze behavior from the visual profile.

9. The non-transitory computer-readable medium of claim 8, wherein the visual profile indicates the present gaze behavior of the operator when the operator was previously driving at a defined performance level, and
wherein the instructions to determine the defined performance level further include instructions to:
monitor at least one performance attribute including one or more of a braking frequency, a steering wheel reversal rate, an accelerator depression frequency, or a frequency of deviations of the vehicle from a centerline, and
generate the defined performance level using a heuristic to process the at least one performance attribute.

10. The non-transitory computer-readable medium of claim 7, wherein the at least one of: a duration of time for the gaze score to satisfy a stability threshold, a duration of time for a defined time to elapse, or a duration of time to phase out the rendering after a defined time-out period.

11. The non-transitory computer-readable medium of claim 7, wherein the instructions to identify the objects further include instructions to analyze dynamic vehicle data to determine objects in the present operating environment having classifications that are similar to the visual profile, and
wherein the classifications indicate at least one of road signs, vehicles, lane markers, roadways, or pedestrians.

12. A method for improving a visual scanning behavior of an operator in a vehicle with a vehicle display, comprising:
identifying, in response to detecting a transition to a manual mode of operating the vehicle and using at least one sensor of the vehicle, objects in a present operating environment around the vehicle;
determining, based on information, contained in a visual profile of the operator, about a past gaze behavior of the operator in a similar operating environment, a particular gaze pattern with respect to specific objects of the objects; and
controlling the vehicle display to selectively render, according to at least a gaze score, one or more graphic elements in the vehicle display to augment or supplement a viewing of the specific objects in the present operating environment for a specific duration of time, wherein the specific duration of time is less than a duration of time associated with a change in the gaze score, the duration of time being from a time of a commencement of the transition to a time at which the gaze score satisfies a stability threshold.

13. The method of claim 12, further comprising:
monitoring the operator by collecting at least gaze data from an eye-tracking camera to identify a present gaze behavior, wherein the present gaze behavior indicates a focus of eyes of the operator on a particular set of target objects and an eyes on road (EOR) time, and
generating, in response to the transition, the gaze score of the operator by characterizing deviations of the present gaze behavior from the visual profile.

14. The method of claim 13, wherein the present gaze behavior is defined over at least a period of time or a distance.

15. The method of claim 13, wherein the visual profile includes the present gaze behavior of the operator when the operator was previously driving at a defined performance level.

16. The method of claim 15, further comprising:
determining the defined performance level by monitoring at least one performance attribute including one or more of a braking frequency, a steering wheel reversal rate, an accelerator depression frequency, or a frequency of deviations of the vehicle from a centerline and generating the defined performance level using a heuristic to process the at least one performance attribute.

17. The method of claim 12, wherein the specific duration of time is based on at least one of: a duration of time for the gaze score to satisfy a stability threshold, a duration of time for a defined time to elapse, or a duration of time to phase out the rendering after a defined time-out period.

18. The method of claim 12, wherein the controlling the vehicle display further includes one or more of:
(i) adding elements to a perimeter of the objects as graphic overlays within the vehicle display and selectively flashing the graphic overlays at different frequencies according to at least one of a classification of an object or a relative distance that the object is from the vehicle,
(ii) varying a number of the graphic elements displayed within the vehicle display,
(iii) varying at least one of an opacity or a color of the graphic elements within the vehicle display; or
(iv) alternatively flashing the graphic overlays between two or more of the objects within the vehicle display.

19. The method of claim 12, wherein the identifying the objects includes analyzing dynamic vehicle data to determine the objects in the present operating environment having classifications that are similar to the visual profile,
wherein the classifications include at least one of road signs, vehicles, lane markers, roadways, or pedestrians.

20. The method of claim 12, wherein, when the visual profile of the operator is not available, the identifying the objects includes analyzing dynamic vehicle data to determine the objects in the present operating environment having classifications that are similar to a default set of classifications, and
wherein the controlling the vehicle display to selectively render further includes initially displaying the one or more graphic elements in response to the transition and until a defined time elapses.

21. A system, comprising:
a processor; and
a memory storing:
a monitoring module including instructions that when executed by the processor cause the processor to:
identify, in response to a transition to a manual mode of operating a vehicle, objects in an environment external of the vehicle; and determine, based on information about a past gaze behavior of the operator in a similar operating environment, a particular gaze pattern with respect to specific objects of the objects, wherein the information is contained in a profile of an operator of the vehicle; and a rendering module including instructions that when executed by the processor cause the processor to render, based on a gaze score of the operator and for a specific duration of time, graphic elements in a display of the vehicle to augment or supplement a viewing of the specific objects in the environment external of the vehicle, wherein the specific duration of time is less than a duration of time associated with a change in the gaze score, the duration of time being from a time of a commencement of the transition to a time at which the gaze score satisfies a stability threshold.

22. The system of claim 21, wherein the profile includes the information about the past gaze behavior of the operator determined from a previous operation of the vehicle in the manual mode by the operator.

23. The system of claim 22, wherein the gaze score characterizes a deviation of a present gaze behavior of the operator from the profile.

24. The system of claim 21, wherein a graphic element, of the graphic elements, is associated with a specific object of the specific objects.

25. The system of claim 21, wherein the rendering module further includes instructions that when executed by the processor cause the processor to render the graphic elements for an additional specific duration of time that commences at a completion of the specific duration of time.

26. The system of claim 25, wherein a completion of the additional specific duration of time is the time at which the gaze score satisfies the stability threshold.

27. The system of claim 21, wherein the rendering module further includes instructions that when executed by the processor cause the processor to render the graphic elements for an additional specific duration of time that commences at a completion of the specific duration of time.

28. The system of claim 27, wherein the instructions to render the graphic elements for the additional specific duration of time comprise instructions to render, in response to a determination of a change in a driving condition, the graphic elements for the additional specific duration of time.

29. The system of claim 21, wherein the rendering module further includes instructions that when executed by the processor cause the processor to cause, at a completion of the specific duration of time, a rendering of the graphic elements to commence a phase out.

30. The system of claim 29, wherein the phase out has a defined phase-out duration of time.

31. The system of claim 29, wherein the instructions to cause the rendering of the graphic elements to commence the phase out comprise instructions to cause, in response to a determination that the gaze score, at a time of the completion of the specific duration of time, fails to satisfy a stability threshold.

32. The system of claim 21, further comprising receiving, from a remote server, the graphic elements.

33. The system of claim 21, wherein:
the specific objects comprise a first specific object and a second specific object,
the particular gaze pattern comprises a pattern of alternating gazes, the pattern of alternating gazes being a pattern of alternating between gazing at the first specific object and gazing at the second specific object,
the graphic elements comprise a first graphic element and a second graphic element, and
the instructions to render include instructions to render, according to the pattern of alternating gazes:
the first graphic element to augment or supplement the viewing of the first specific object, and
the second graphic element to augment or supplement the viewing of the second specific object.

* * * * *